May 26, 1936.　　R. C. BENNER ET AL　　2,041,808

SILICON CARBIDE REFRACTORY

Filed Dec. 8, 1932

MODULUS OF RUPTURE

APPARENT DENSITY

RATE OF OXIDATION

PREFERRED MIXTURE
WITHIN CROSS HATCHED AREA.

INVENTORS
RAYMOND C. BENNER
GEORGE J. EASTER
BY ALMER J. THOMPSON
ATTORNEY

Patented May 26, 1936

2,041,808

UNITED STATES PATENT OFFICE 2,041,808

SILICON CARBIDE REFRACTORY

Raymond C. Benner, George J. Easter, and Almer J. Thompson, Niagara Falls, N. Y., assignors to The Carborundum Company, Niagara Falls, N. Y., a corporation of Pennsylvania Application December 8, 1932, Serial No. 646,276

5 Claims. (Cl. 106—9)

Our invention relates to improved refractory articles made of oxidizable materials such as silicon carbide and to the process of producing the same.

In the art as hitherto developed there have been two principal types of refractories—first, those in which a low percentage of added bonding material is used and in which an effort is made to protect the oxidizable granular material constituting the refractory body by making the article as dense, non-porous and impermeable as possible. The refractory described in Tone's Patent No. 1,204,211 is representative of this general class.

The second type of silicon carbide refractory is represented by Tone's Patent No. 1,296,715 and comprises relatively coarse silicon carbide particles, the interstices between which are filled with a high percentage of refractory clay.

Despite the efforts to prevent oxidation of refractories of the former type by keeping the oxidizing gases from penetrating the exceedingly small pores of the refractory, it has been found that these articles oxidize in service to an extent which has prevented their use in many installations. In an effort to reduce this oxidation, various bonding materials have been suggested to coat the grains and prevent oxidation; as for example, those described in the copending application of Benner and Baumann, Serial No. 630,494, filed August 26, 1932, and attempts have also been made to coat the outside of the refractory piece with a glaze which will be impervious to gases; for example, that described in Martin's Patent No. 1,653,918. While these bonds and glazes have unquestionably been beneficial in retarding oxidation, they have not entirely prevented it.

In the case of refractories containing a high percentage of clay, the body has either proved to be so open as to permit relatively easy oxidation of the silicon carbide, or has been so vitreous in its structure as to be unduly subject to destruction by rapid temperature changes. Further, in either case, the presence of the large amount of clay material has made it impossible to use this type of brick at the higher temperature ranges where the clay softens and lubricates the slippage of the silicon carbide grains past one another to an extent that causes the refractory to fail rapidly under load.

In the oxidation of silicon carbide refractories, a film of solid silica is formed around each silicon carbide crystal. This silica is formed by the reaction $SiC + 2O_2 = SiO_2 + CO_2$. From this it is obvious that for each 40 grams of silicon carbide oxidized 60 grams of silica are produced. It is further apparent that since silicon carbide has a specific gravity of 3.17, while that of silica runs from 2.2 to 2.6, the volume of the silica produced is at least 50% greater than that of the silicon carbide which was oxidized in order to form it. It is, moreover, formed as a solid material occupying for the most part the same space as was occupied by the silicon carbide from which it was formed.

This means that there is a marked tendency for the silica formed at the juncture between silicon carbide particles to wedge these particles apart and cause the refractory considered as a whole to grow. In aggravated cases, this growth of the refractory has amounted to as much as 8% to 10% in length. Inasmuch as such growth usually takes place unequally in different parts of a given furnace installation due to the differences in oxidizing conditions prevailing, it very rapidly results in disruption of the furnace structure to a point which renders the furnace unfit for further service.

We have been impressed with the fact that this growth apparently is approximately proportional to the number of intercrystalline contacts at which the silica causes expansion and have, accordingly, conducted experiments to ascertain to what extent the number of such contacts might be decreased and still secure a serviceable brick. We have found that by increasing the average particle size, the density of the resulting article is decreased, and its permeability to gases increased, results which should presumably increase the tendency to oxidation. We find on the contrary however that by using suitably coarse grits we actually materially cut down the rate of oxidation and at the same time secure other advantages over the ordinary product in which finer crystals are also present.

In the first place, we find that the bonding materials which may be added are much more effective when the coarser crystals only are used as apparently they are better able to spread themselves over the surface of such crystals even when considerably lower percentages of bond are used. The bond thus further decreases the rate of oxidation. In the second place, the structure of refractories made from coarse grain, while not too open to be serviceable, is so much less rigid than that of the ordinary dense refractories that the brick are found to be decidedly superior in their resistance to spalling on sudden temperature change. Thirdly, due to the more discontinuous structure, we find that the thermal conductivity of our improved refractories is somewhat lower than that of the denser type. While this is a disadvantage in cases where the refractories primarily require ability to transmit heat, it has distinct advantages in a large number of furnace applications where the excessive heat losses through the wall have long militated against the use of silicon carbide refractories, although their extreme refractoriness would otherwise have rendered their use very advantageous. This is particularly true in the outer walls of furnaces. As suggested above, the reduced number of contact points is found to be effective in reducing the rate of growth upon oxidation, so that even when considerable oxidation has taken place the refractories remain serviceable and do not disrupt the furnace structure as a whole. In the case of refractories having a bond capable of dissolving some of the silica formed by oxidation, this effect is particularly noticeable as the increase in bulk is apparently taken care of by ability of the dissolved silica to squeeze sidewise into the larger parts of the pore spaces rather than remaining concentrated at the point of contact between two crystals where high pressures are developed by the formation of the silica film.

We have further found that due to the large diameter of the pores in our improved refractories, as compared with the older type, ours are less delicate on drying and hence may be dried more rapidly, and are also more permeable to oxidizing gases so that the temporary binder which is used in their fabrication can be more readily burned out than is possible in the case of the dense type of refractories, and hence it is not necessary to hold our refractories in the so-called water-smoking or low oxidizing temperature range (approximately 700–900° C.) for nearly as long a time as has been the usual practice in order to burn out this carbonaceous material and prepare for proper vitrification of the bond. This materially reduces the cost of burning this type of material. Furthermore, the tendency of our refractories to have dark centers in which the carbonaceous materials have not been properly burned out and in which the dark centers prevent proper development of the bond is materially decreased. This means that the damage in subsequent service which has so often hitherto resulted from failure of the undeveloped bond to adequately protect the silicon carbide from oxidation is greatly diminished in our product. Otherwise, no marked difference in the method of vitrification is involved in comparison with the older product.

We further find that our new refractories are much superior to the type hitherto made with a high clay content in that they are capable of use at furnace temperatures considerably in excess of those which the high clay bonded refractories can withstand satisfactorily. Further, their thermal conductivity is higher than that of the clay bonded pieces so that in cases where the ability to transmit heat is desirable they have a further advantage over the older type refractory.

In our experiments to determine the best mixtures of grit sizes to be used for our purpose, we divided our silicon carbide into the following three groups:

Coarse—passes thru 14 mesh but remains on 36 mesh.
Medium—passes thru 36 mesh but remains on 80 mesh.
Fine—passes thru 80 mesh.
The mesh numbers are per linear inch.

While there is always some overlapping of grit sizes in the various portions in any commercially screened material, this overlapping was kept as low as possible and the fine material so selected that the major portion was substantially coarser than 200 mesh. Fourteen (14) mesh has been selected as the starting point at the coarse end as being approximately the diameter of the largest pieces which can usually be secured in solid form.

We then mixed the three grades of grits in different proportions and after adding suitable bond, such as 3% of clay or 5% of silicon carbide of colloidal fineness, together with a temporary binder, molded test pieces under a pressure of 5000 lbs./sq. in. and burned them in a kiln to approximately Cone 16. We then tested these various pieces and plotted the results on triangular diagrams.

In the illustration shown herewith—

Figure 1:
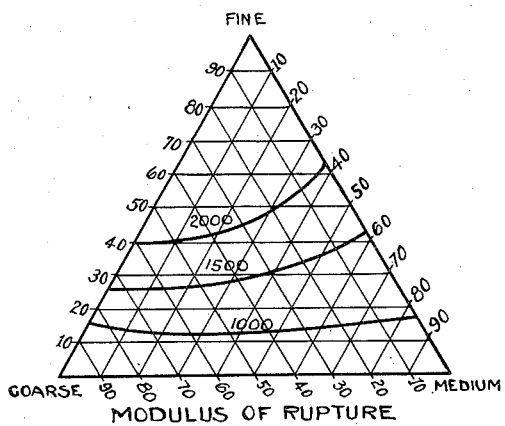
Figure 1 shows a triangular diagram in which the cold modulus of rupture in pounds/sq. in. of pieces made from various grit mixtures is indicated.

In determining which mixes to use, we have selected as a criterion that the modulus of rupture of the refractory when tested cold must be at least 1000 pounds/sq. in. While this figure is somewhat arbitrary, it forms a satisfactory guide and we have found that with suitable bonds such as those mentioned above, this strength continues to characterize the piece to relatively high temperatures. The lines shown on Fig. 1 are drawn so that the mixes corresponding to points below them have, in general, moduli of rupture less than 1000 lbs./sq. in., 1500 lbs./sq. in. and 2000 lbs./sq. in. respectively, while those above the upper one have a modulus rupture of 2000 lbs./sq. in. or over.

Figure 2:
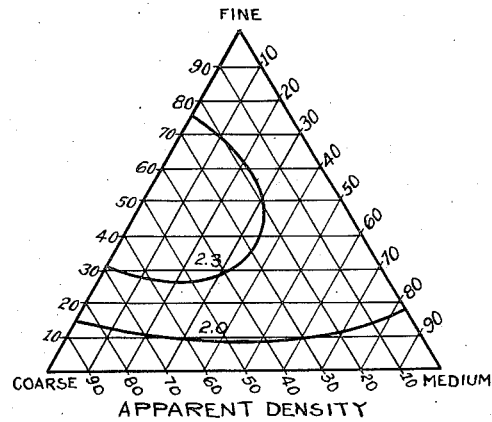
Figure 2 shows a triangular diagram in which the apparent density of pieces made from various grit mixtures is indicated.

As a check on the modulus of rupture, which we find parallels density to some degree, we have prepared Fig. 2 in which we have drawn a line dividing the mixes which have densities of 2 or more from those of lower density. We have also drawn a line separating a smaller area in which densities greater than 2.3 are found, from the area of lower densities. This smaller area evidently corresponds to the mixes covered by Tone's Patent No. 1,204,211.

Figure 3:
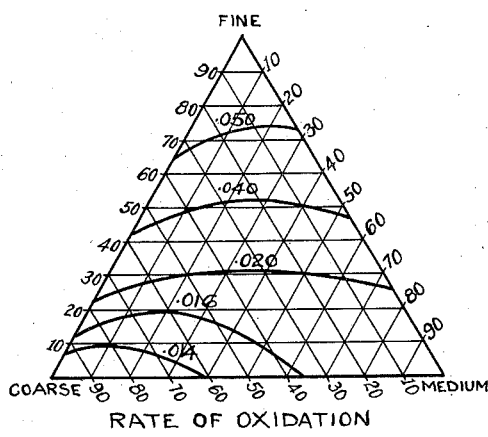
Figure 3 shows a triangular diagram in which the relative rate of oxidation of pieces made from various grit mixtures is indicated.

Finally, we have measured the relative rate of oxidation of various specimens by measuring the carbon dioxide formed upon alternately oxidizing the test piece in dry oxygen at 1000° C. at atmospheric pressure and then exhausting the atmosphere through an absorbent of carbon dioxide, reducing the pressure momentarily to three inches of mercury at 15 minute intervals over a period of five hours, thus repeatedly subjecting the entire grain surface to fresh oxidizing gases. In Fig. 3, which is compiled from these results, we have drawn a number of lines indicating rates of oxidation of mixes lying in the different parts of the diagram in terms of percentage of the original weight of silicon carbide oxidized during the five hour treatment. We have found that the rate of approximately .040 is characteristic of many of the better grade of dense silicon carbide refractories as ordinarily made and have, accordingly, taken as our criterion a rate of .020 which is half of that value.

Figure 4:
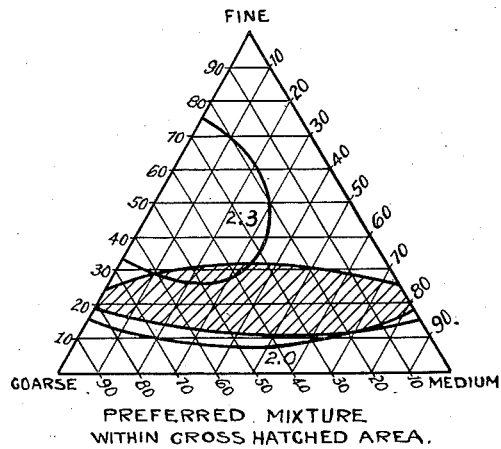
Figure 4 shows a triangular diagram in which the preceding three have been combined in such a way as to indicate by a shaded area the region in which the most desirable mixes for commercial refractories are located.

By combining these various curves to indicate mixes which have a modulus of rupture in excess of 1000 lbs./sq. in., a density of at least 2.0 and an oxidizing rate not exceeding .020% in five hours, we arrive at the cross hatched area shown in Figure 4. It will be noted that this area includes only a very small portion of the diagram in which densities over 2.3 are secured. We, therefore, regard such high densities as an unnecessary and even an undesirable accompaniment in the production of oxidation resistant refractories. The results of this figure may be expressed numerically approximately as follows:

The desirable refractory mixes have coarse, medium and fine grits in the following proportions.

|  | Per cent |
| --- | --- |
| Coarse | 0 to 80 |
| Medium | 0 to 80 |
| Fine | 10 to 30 |

For economy of preparation, it is desirable that at least half of the material which is coarser than 80 mesh shall also be coarser than 36 mesh and at least one fourth finer than 36 mesh.

We have found that the percentage of bond required in our type of refractory is generally less than that required when a large percentage of fines is present. In general, from 2 to 5% is sufficient, although we have used as high as 20% in certain instances where we have been particularly concerned with reducing the porosity of the piece.

To summarize now, in making our improved refractories, we take silicon carbide and by either special adjustment of the crushing machinery to yield the desired grit size directly or by crushing in the usual manner followed by screening and remixing, prepare a batch of silicon carbide grain in which the proportion of various grit sizes is:

|  | Per cent |
| --- | --- |
| Thru 14 mesh on 36 | 0 to 80 |
| Thru 36 mesh on 80 | 0 to 80 |
| Thru 80 mesh on 200 | 10 to 30 |

To this material we add suitable permanent (vitrifiable) and temporary binders, for example, 3% to 15% of kaolin and 3% of cellulose sulfite pitch respectively and enough water to impart the proper consistency for molding, and after thorough mixing we press or tamp the mix into the desired shape and thereafter dry and burn the formed piece in the usual manner except that the time of holding in the dryer and in the low oxidizing temperature range may be decreased as noted above. In this way refractories are secured having satisfactory strength, a density between 2.0 and 2.3, and a low oxidation rate as described above.

The use of grit mixtures as above described is also applicable to the manufacture of silicon carbide heating elements. These elements are usually operated at comparatively high temperatures, and show a continual increase in resistance during their operation. Although in most cases there is no apparent or visual oxidation of the silicon carbide, the use of mixes containing relatively coarse particles, and particularly mixes containing a minimum amount of fines, materially increases the life of the element.

Having thus described our invention in sufficient detail to give a clear understanding of its value and to permit its utilization by those skilled in the art of silicon carbide refractory manufacture what we claim is—

1. A silicon carbide refractory in which from 70 to 90% of the silicon carbide is coarser than 80 mesh and substantially all the rest of the silicon carbide is finer than 80 mesh but coarser than 200 mesh, said refractory having a density between 2.0 and 2.3 and comprising from 2 to 20% of an added ceramic binder.

2. A raw batch for the manufacture of a silicon carbide refractory, in which raw batch from 70 to 90% of the silicon carbide is coarser than 80 mesh and substantially all the rest of the silicon carbide is finer than 80 mesh but coarser than 200 mesh, said batch comprising from 2 to 20% of an added ceramic binder.

3. A silicon carbide refractory having a density between 2.0 and 2.3 and comprising from 2 to 20% of an added ceramic binder, in which refractory from 30 to 60% of the silicon carbide is coarser than 36 mesh and from 10 to 30% of the silicon carbide is finer than 80 mesh but coarser than 200 mesh, substantially all of the silicon carbide being coarser than 200 mesh.

4. A raw batch for the manufacture of a silicon carbide refractory, in which raw batch from 30 to 60% of the silicon carbide is coarser than 36 mesh and from 10 to 30% of the silicon carbide is finer than 80 mesh but coarser than 200 mesh, substantially all of the silicon carbide being coarser than 200 mesh.

5. A silicon carbide heating resistor in which from 70 to 90% of the silicon carbide is coarser than 80 mesh and substantially all the rest of the silicon carbide is finer than 80 mesh but coarser than 200 mesh, said resistor having a density between 2.0 and 2.3.

RAYMOND C. BENNER.
GEORGE J. EASTER.
ALMER J. THOMPSON.